Figure 3:
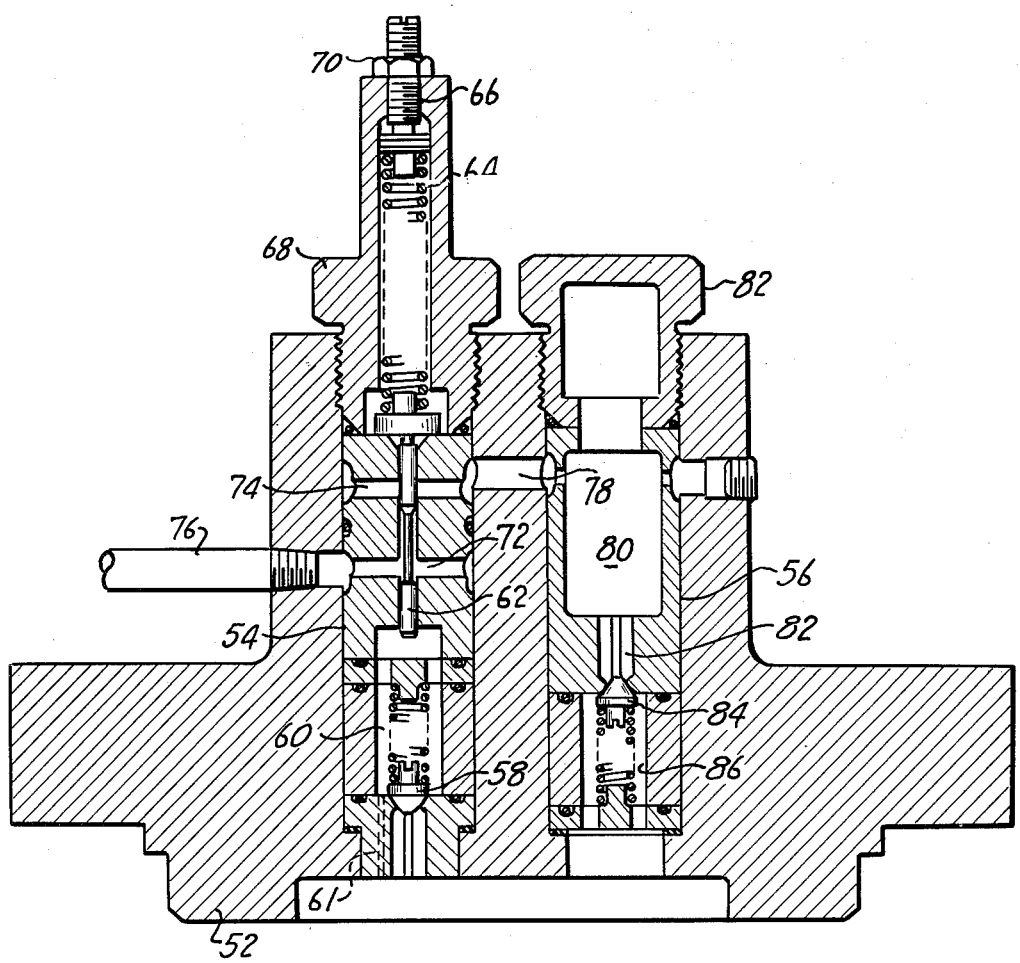

Dec. 6, 1955   W. R. CROOKS   2,725,742
APPARATUS FOR FATIGUE TESTING OF HOLLOW BODIES
Filed Dec. 15, 1951   3 Sheets-Sheet 1
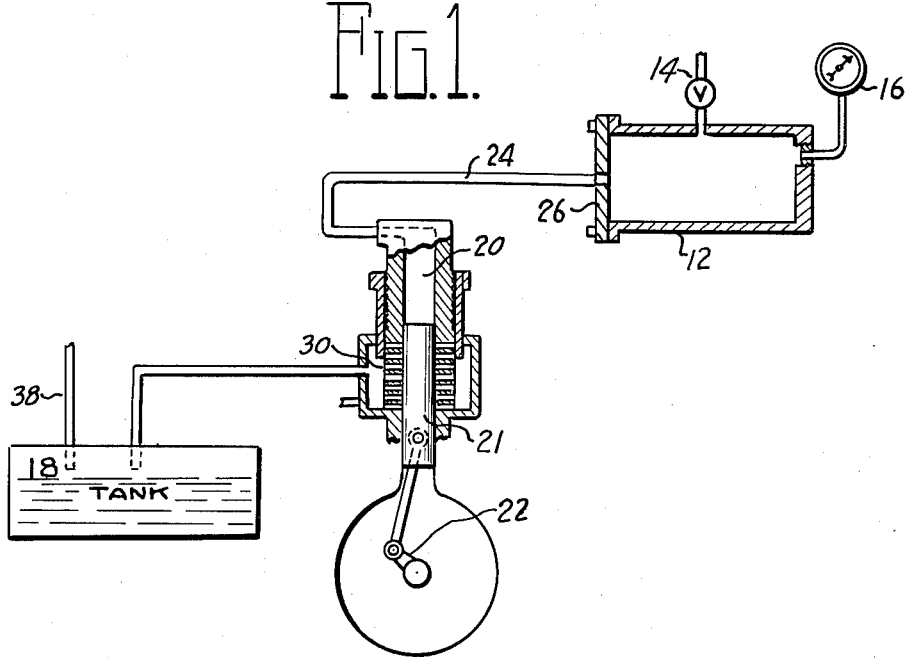
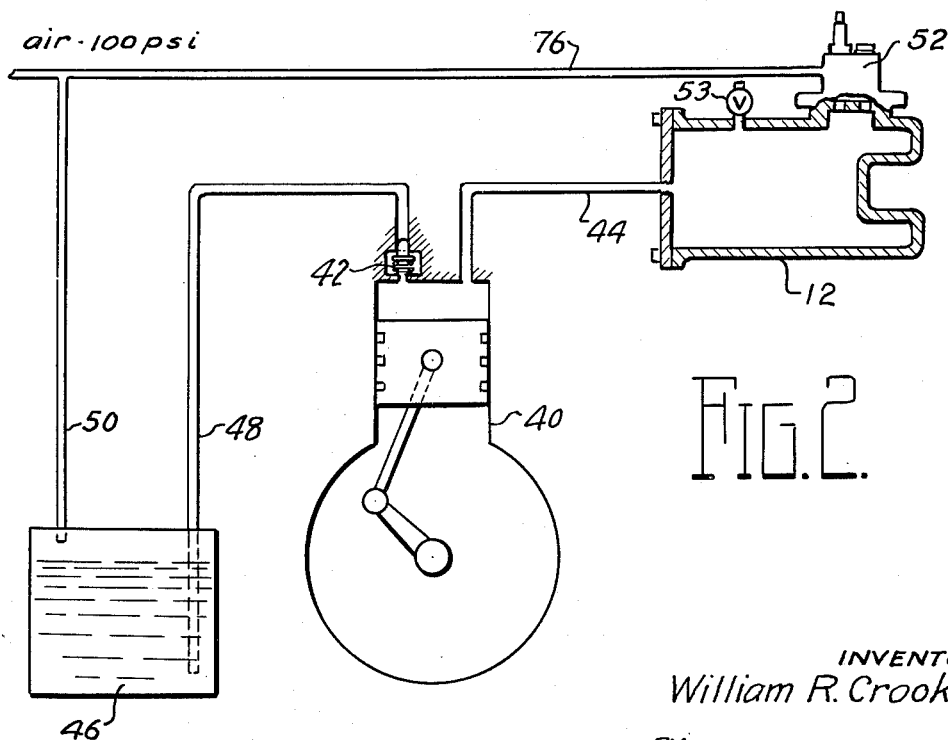
INVENTOR
William R. Crooks
BY
ATTORNEYS

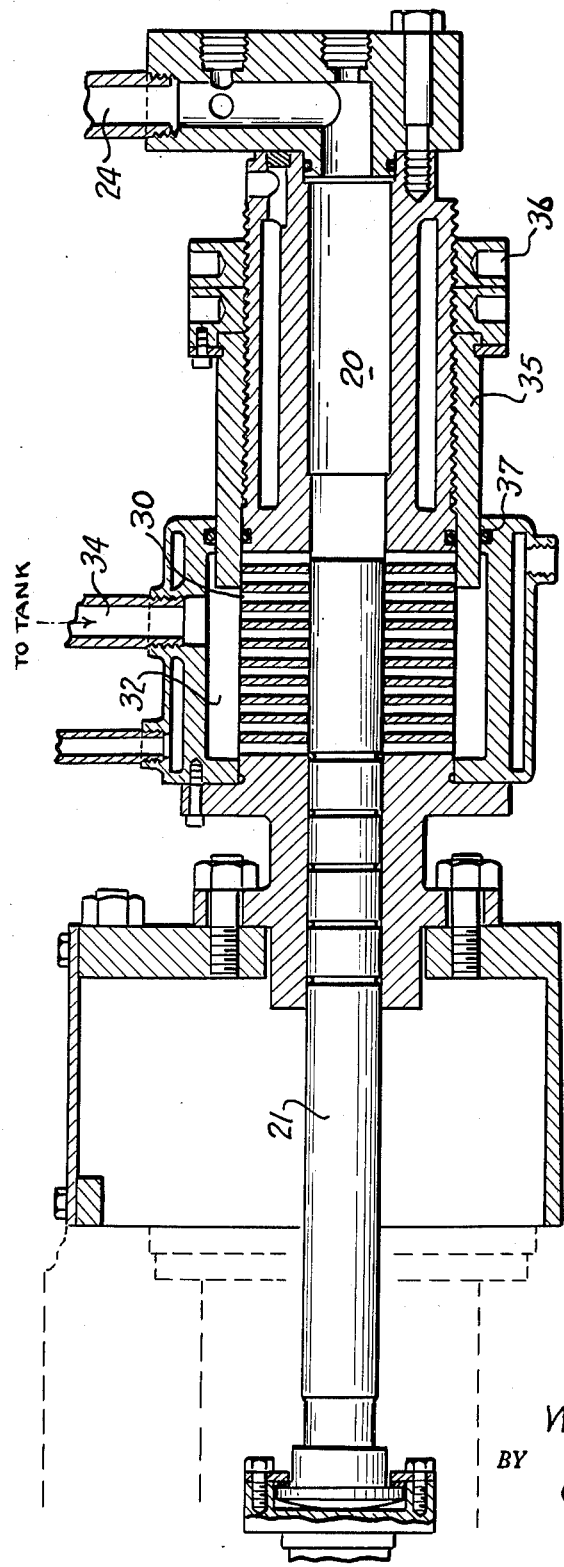

United States Patent Office 2,725,742
Patented Dec. 6, 1955

2,725,742

APPARATUS FOR FATIGUE TESTING OF HOLLOW BODIES

William R. Crooks, Mount Vernon, Ohio, assignor to The Cooper-Bessemer Corporation, Mount Vernon, Ohio, a corporation of Ohio Application December 15, 1951, Serial No. 261,888

4 Claims. (Cl. 73—49.4)

This invention relates to an apparatus for testing hollow bodies that are expected to be subjected to high fluid pressures in service.

In the manufacture of pumps, compressors, and similar equipment it has been the usual practice to design the wall sections and parts that are subject to pressure, heavy enough to give the desired life. Even when using the most approved engineering methods, and taking the strength of materials obtained from laboratory test samples, there are many unknown factors in designing a complicated pressure vessel. In complicated shapes, and in castings, the strength of the material varies somewhat from the characteristics as determined by laboratory tests, thus making it extremely desirable to fatigue test the full sized pressure vessels with loads in excess of their operating loads.

Long periods of operation in actual use determine the loads or pressure levels at which a vessel must operate. The present invention provides a means of evaluating the safe working loads of a vessel for higher pressures, new designs, or new materials. It is, of course, possible to test samples of materials from which the pump or compressor body is made, but no test other than a static bursting test has been conducted on complicated machines or parts thereof.

It is a well recognized fact that metal bodies can withstand very high static loads and yet fail in service under apparently lower, but cyclically repeated stress. The primary object of the present invention is to provide a novel apparatus for testing hollow bodies to determine their strength against fatigue failure.

Another object of the invention is to provide an apparatus for use in fatigue testing of hollow bodies which will assure a repetitive stress of substantially constant maximum and minimum amplitude, with the two limits being adjustable at the selection of the operator.

Still another object of the invention is to provide an apparatus for use in fatigue testing of hollow bodies which will automatically maintain a proper density of the testing fluid to assure a constant predetermined maximum stress.

Other objects and advantages of the invention will become apparent from the following description of two forms of apparatus constructed in accordance with the invention.

Briefly stated the invention comprises testing hollow bodies for fatigue failure by the cyclic application of fluid pressure preferably applied between a low pressure which represents a relaxed condition of the body under test, and a high pressure which is at least equal to the pressure at which the body is expected to perform in service. In those instances where the geometry of the body under test is such that entrapped air can be readily bled from the system, a simple variable delivery pulsator can be used. In other instances where the configuration is such that entrapped air can be eliminated only with difficulty, the invention comprises means to vary the density of the testing fluid to assure a constant, but adjustable, maximum stress in the body under test.

Fig. 1 of the drawings discloses diagrammatically a suitable system for testing hollow bodies from which entrapped air can be bled; Fig. 2 is a diagrammatic disclosure of an apparatus suitable for testing hollow bodies of complex configuration in which the testing fluid is of variable density; Fig. 3 is a central vertical sectional view of an automatic density adjusting mechanism suitable for use in conjunction with the system shown in Fig. 2; and Fig. 4 is a central vertical sectional view of a pulsator of the type usable in the system of Fig. 1.

Referring to the drawings and particularly to Fig. 1, the apparatus there shown comprises a variable delivery pulsator 20 and a body 12 under test. Body 12 is indicated as a simple cylinder. An air bleed valve 14 is attached to the top of the cylinder to assure that it can be completely filled with liquid and that any air which may originally be in the system can be bled. A gage 16 is provided which is attached to the cylinder under test or which may be attached to any other portion of the system to indicate the maximum attained pressure during the testing operation. A source of liquid may conveniently take the form of a conventional tank 18 in which the testing liquid may be maintained either at atmospheric pressure or at any other selected pressure.

In the manufacture of high pressure compressing equipment it has been customary to subject the finished parts to a static pressure test to determine their suitability for use in the field. The parts are designed with a large factor of safety, and while failure is infrequent it is of such severity when it occurs that all precautions should be taken against it. Failure of a pump delivering oil at, for example, 3,000 p. s. i. can readily lead to severe consequences. Such pressures are commonly encountered, particularly in the oil industry. The static tests presently conducted are not capable of reliably indicating those parts of a new design that may ultimately give trouble in service. It is well known in the mechanical testing of metallic elements that a static load can safely be carried by many devices that will subsequently fail under repeated stress of a magnitude less than the applied static load. Such fatigue failure is due to stress concentrations arising from the configuration of the part, from its surface condition and from the rate of application of the stress as well as its amplitude. Fatigue testing by the application of repeated bending loads or by repeated tensile or compressive stress is well known, but prior fatigue testing has always been done mechanically so that the testing of hollow pressure vessels for fatigue failure has not, to my knowledge, been done.

The present invention provides for repeated application, through a hydraulic medium, of a stress of a magnitude which will lead to fatigue failure of an improperly designed hollow pressure vessel. The stress is, of course, below that required for static rupture of the vessel and is preferably comparable to or somewhat above the maximum stress to be applied in service.

Various means may be used to develop the hydraulic pressure required to apply the fatigue load. In those instances where the system may be bled free of entrapped air a variable delivery pulsator having a cylinder capacity equal to the sum of the volume increase caused by elongation of the walls of the testing vessel and the compression of the testing liquid will suffice.

Referring again to Fig. 1 the variable delivery pulsator comprises a cylinder 20 in which a piston 21 is reciprocated by a crank 22. Provision is made for varying the position of the intake opening of the cylinder 20 as will be subsequently described in conjunction with Fig. 4. The pulsator requires no discharge valve so that the output of cylinder 20 can be connected directly to the testing vessel by a simple conduit 24 and attached to the testing vessel in any suitable manner as by a cylinder end closing plate 26.

In the system shown, the pulsator cylinder 20 is preferably provided with a series of spaced inlet or suction ports 30 so that the effective length of stroke of the pulsator can be varied at the selection of the operator. As shown in Fig. 4 the ports 30 are formed as radial passages in the wall of the pulsator cylinder 20 and communicate with an inlet space 32 into which a supply line 34 opens. A sleeve 35 is provided around the exterior of cylinder 20 to enable the operator to adjust the capacity of pulsator 10 by adjusting the effective length of the stroke of the pulsator. Obviously, until the suction ports are closed by the pulsator piston, no discharge will take place, and no pressure will be built up in the system. Sleeve 35 is threaded over the pulsator cylinder and is held against longitudinal displacement after it is once adjusted by follower rings 36. The sleeve may be packed against leakage in any suitable manner as by rings 37. Supply 34 connects directly to tank 18 in which a supply of testing liquid, preferably oil, is maintained. In the event that the test is to be conducted with a positive pressure at the low point in the cycle, the oil in tank 18 may be put under pressure in any suitable manner as by connecting an air line 38 into the top of the tank, the line extending to the usual shop air compressor, or to a special compressor if the shop pressure is too high or too low.

The operation of the system shown in Fig. 1 is apparent. The vessel under test is connected by a tight hydraulic circuit with pulsator 20 and tank 18. Air is bled from the system on the first few strokes of the pulsator and the bleeding valve 14 may then be closed. The capacity of the pulsator is adjusted to equal the expansion of the system from the relaxed state to the distended state, plus the compression of the test liquid. The pressure of the pulsator is thus imposed, during continued operation, cyclically and the maximum pressure is adjusted to exceed somewhat the maximum service pressure of the vessel. For example, if the vessel or test part is to become a part of a pump having a discharge pressure of 2000 p. s. i., the test may well be conducted at 2500 p. s. i. and continued over a period of several hundred thousand cycles. The strength of the body in fatigue can thus be ascertained and any faulty elements of design corrected.

Referring now to the system shown in Fig. 2, the vessel under test is of such configuration that it is difficult to bleed all of the air therefrom prior to the start of the fatigue run. The apparatus is thus so arranged that the density of the test fluid is maintained so that its compressibility will result in a constant maximum pressure. This may be accomplished by any suitable device which will substitute a gas for a portion of the test liquid whenever the maximum pressure exceeds that selected for the test.

The circuit again includes a pulsator 40 having an inlet valve 42 but no discharge valve, being connected directly by pipe 44 to the test vessel 12. In this instance, however, pulsator 40 is a constant displacement pump, rather than a variable displacement unit, as in the case of pulsator 20 above described. The pulsator inlet is connected to a supply tank 46 by pipe 48 and liquid in the tank is maintained under pressure by an air line 50. A density control device 52 is attached to the test vessel, as well as an air bleed and relief valve 53.

The density control device 52 is shown in Fig. 3 and comprises a body having parallel bores 54 and 56 in valved connection to the interior of the test vessel. Bore 54 contains an outwardly opening check valve 58 controlling communication between the interior of the test vessel and a chamber 60 which thus attains the same maximum pressure as the test vessel. A small return bleed passage 61 connects chamber 60 to the interior of the test vessel. A spring pressed plunger or spool valve 62 is provided which has one end exposed to the pressure in chamber 60 and its opposite end in engagement with a spring 64 the force of which can be adjusted, as by a screw 66 threaded into the end of a plug 68 that closes the top of bore 54. A lock nut 70 maintains the adjustment of screw 66.

The center of spool valve 62 is reduced for a predetermined distance and controls the communication between spaced ports 72 and 74. Port 72 communicates directly with an air line 76 and port 74 communicates with a passage 78 opening at its far end into an air cell 80 formed in bore 56 and closed at its upper end by a plug 82, the interior of which may, if desired, form part of the volume of the air cell. Thus, when spool valve 62 is moved upwardly to a predetermined extent against the force of spring 64, air can pass from port 72 around the reduced center part of the valve, through port 74, passage 78 and into air cell 80 to charge the latter with a predetermined volume of air at a predetermined pressure, the pressure being preferably derived from the shop air line at for example, 100 p. s. i. This same air line may conveniently be used to maintain pressure in the supply tank 46.

Air cell 80 has a passage 82 in its lower or inner end which is controlled by an outwardly opening check valve 84 disposed in a passage 86 which communicates constantly and directly with the interior of the test vessel. It will thus be seen that whenever the pressure in the test vessel is relaxed below the pressure in air cell 80, valve 84 will open to permit the fluid in the cell 80 to enter the test vessel.

The operation of the device shown in Fig. 3 during a fatigue test is as follows: when the test is first started, the system is filled with oil as completely as possible and the constant displacement pulsator 40 started. Oil is admitted until some of it comes out of bleed valve 53 attached to the test vessel. Operation of the system is automatic from this point on. Pulsator 40 increases the pressure in the test vessel during its discharge stroke, and the fluid therein passes check valve 58 to act, in chamber 60, against the lower exposed face of spool valve 62. If the pressure is above that for which adjustable spring 64 is set, valve 62 moves upwardly and admits a charge of air into air cell 80 by opening communication between ports 72 and 74. The fluid from chamber 60 can return to the test vessel by the small bleed passage 61 so that valve 62 can return to its normal close position after the charge of air has passed it. When the pressure in the test vessel relaxes on the downstroke of pump 40, the air stored in cell 80 flows past check valve 84 into the test vessel. The air in the vessel displaces a certain quantity of the oil therein so that the fluid in the system taken in its entirety is now somewhat more compressible than on the previous stroke so that the maximum pressure on the following strokes is somewhat less. Since oil can be forced into the system from tank 46 whenever the low point in the fatigue cycle is below the tank pressure, testing within the predetermined limits is assured. The process of bleeding air from cell 80 into the test vessel is repeated whenever it becomes necessary to reduce the maximum pressure.

The cyclic repetition of pressure is maintained, again over a very long period and the test vessel demonstrates either that it and similar vessels are capable of resisting fatigue failure or that the design is, in some respect, faulty. It is apparent that the fatigue test so conducted is a much more reliable indication of the acceptability of a design than is any static bursting test.

In the event that the test vessel is a sample of a part that is expected to operate in a corrosive environment, the effects of corrosion fatigue can also be measured with apparatus constructed in accordance with my invention. It is only necessary that the fluid pumped during the test resemble, in its corrosive properties, the material to be encountered in the field.

What I claim is:

1. Apparatus for testing a hollow body which comprises the combination of a pulsator having its discharge connected to exert a fluid pressure within said body, a source of fluid connected to the inlet side of said pulsator, means to maintain said source of fluid under pressure, means to drive said pulsator over a cycle from a predetermined maximum pressure to a minimum pressure substantially equal to the pressure of said source, and means to vary said maximum pressure.

2. Apparatus in accordance with claim 1 in which said means to vary said maximum pressure comprises means to vary the field capacity of said pump.

3. Apparatus in accordance with claim 1 in which said means to vary said maximum pressure comprises means to vary the compressibility of the fluid pumped by said pulsator.

4. Apparatus in accordance with claim 1 in which said means to vary said maximum pressure comprises a valve subject on one side to the pressure in the hollow body under test, adjustable spring means acting on the opposite side of said valve, an air line carrying air at a pressure higher than said predetermined minimum pressure and controlled by said valve, an air chamber connected to said air line when said valve is open, said chamber having a passage connecting it with said body and valve means to discharge the contents of said air chamber into said hollow body.

References Cited in the file of this patent

UNITED STATES PATENTS

| 909,950 | Schreidt | Jan. 19, 1909 |
| 1,575,519 | Amsler | Mar. 2, 1926 |
| 1,783,412 | Crowe | Dec. 2, 1930 |
| 1,909,703 | Moore et al. | May 16, 1933 |
| 2,277,813 | Bernhard | Mar. 31, 1942 |

FOREIGN PATENTS

| 989,758 | France | May 30, 1951 |